United States Patent
Pretorius et al.

(10) Patent No.: US 10,746,975 B2
(45) Date of Patent: *Aug. 18, 2020

(54) OBJECTIVE LENS FOR A STILL OR FILM CAMERA AND METHOD FOR SELECTIVE DAMPING OF SPECIFIC SPATIAL FREQUENCY RANGES OF THE MODULATION TRANSFER FUNCTION OF SUCH AN OBJECTIVE LENS

(71) Applicant: Carl Zeiss AG, Oberkochen (DE)

(72) Inventors: Marco Pretorius, Oberkochen (DE); Vladan Blahnik, Oberkochen (DE)

(73) Assignees: Carl Zeiss AG, Oberkochen (DE); Carl Zeiss Microscopy GmbH, Jena (DE)

( * ) Notice: Subject to any disclaimer, the term of this patent is extended or adjusted under 35 U.S.C. 154(b) by 72 days.

This patent is subject to a terminal disclaimer.

(21) Appl. No.: 15/620,643

(22) Filed: Jun. 12, 2017

(65) Prior Publication Data

US 2017/0307860 A1    Oct. 26, 2017

Related U.S. Application Data

(63) Continuation of application No. PCT/EP2015/076613, filed on Nov. 13, 2015.

(30) Foreign Application Priority Data

Dec. 11, 2014  (DE) .......................... 10 2014 118 383

(51) Int. Cl.
*G02B 13/20* (2006.01)
*G02B 27/00* (2006.01)
(Continued)

(52) U.S. Cl.
CPC .......... *G02B 13/20* (2013.01); *G02B 3/0081* (2013.01); *G02B 3/02* (2013.01); *G02B 3/04* (2013.01);
(Continued)

(58) Field of Classification Search
CPC ... G02B 5/00; G02B 5/02; G02B 5/04; G02B 27/0068; G02B 21/33; G02B 3/0081;
(Continued)

(56) References Cited

U.S. PATENT DOCUMENTS 3,305,294 A    2/1967 Alvarez
3,583,790 A *  6/1971 Baker ................. G02B 3/0081
                                              359/676
(Continued)

FOREIGN PATENT DOCUMENTS

DE    102013100680 A1    7/2014
JP    H04324809 A        11/1992

OTHER PUBLICATIONS

International Search Report dated Feb. 11, 2016 of international application PCT/EP20151076613 on which this application is based.
(Continued)

*Primary Examiner* — Nicholas R. Pasko
(74) *Attorney, Agent, or Firm* — Walter Ottesen, P.A.

(57) ABSTRACT

An objective lens for a still or film camera includes a first and second lens-element arrangement, and a wavefront manipulator. The first and second lens-element arrangement are spaced mutually apart along an optical axis of the lens such that an interstice is present therebetween. The wavefront manipulator is in the interstice and includes two optical components displaceable counter to one another, perpendicular to the optical axis, and which each include a freeform surface. The wavefront manipulator has a zero position, wherein the optical components do not cause any image aberrations in the imaging properties of the objective lens, and effective positions, wherein the optical components are displaced counter to one another, out of the zero position perpendicular to the optical axis, and wherein the optical
(Continued)

components cause a spherical aberration in the imaging properties of the objective lens.

24 Claims, 5 Drawing Sheets

(51) Int. Cl.
    *G02B 3/00*     (2006.01)
    *G02B 3/02*     (2006.01)
    *G02B 3/04*     (2006.01)
    *G02B 21/33*     (2006.01)
    *G03B 5/04*     (2006.01)

(52) U.S. Cl.
    CPC ......... *G02B 21/33* (2013.01); *G02B 27/0068* (2013.01); *G02B 27/0075* (2013.01); *G03B 5/04* (2013.01); *G03B 2205/0046* (2013.01)

(58) Field of Classification Search
    CPC . G02B 3/02; G02B 3/04; G02B 13/20; G02B 27/0025; G02B 27/0075; G03B 5/00; G03B 5/02; G03B 5/04
    USPC ................................. 359/554, 557, 676, 677
    See application file for complete search history.

(56) References Cited

U.S. PATENT DOCUMENTS

| | | | | |
|---|---|---|---|---|
| 4,457,592 A * | 7/1984 | Baker | ................... | G02B 3/0081 359/708 |
| 4,650,292 A * | 3/1987 | Baker | ................... | G02B 3/0081 359/676 |
| 4,925,281 A * | 5/1990 | Baker | ................... | G02B 3/0081 359/676 |
| 6,167,206 A * | 12/2000 | Hylen | ...................... | G03B 1/48 396/316 |
| 7,391,966 B2 * | 6/2008 | Hylen | ...................... | G03B 3/10 396/544 |
| 7,443,601 B2 * | 10/2008 | Yoshida | ................. | G02B 15/04 359/683 |
| 7,446,946 B2 * | 11/2008 | Yoshida | ................. | G02B 15/02 359/672 |
| 9,964,760 B2 * | 5/2018 | Pretorius | ................ | G02B 21/02 |
| 2012/0206626 A1 | 8/2012 | Yamamoto | | |
| 2012/0320257 A1 | 12/2012 | Shabtay et al. | | |
| 2013/0070339 A1 * | 3/2013 | Pretorius | ............ | G02B 21/0012 359/557 |
| 2013/0083396 A1 * | 4/2013 | Pretorius | .............. | G02B 27/646 359/557 |
| 2014/0268368 A1 * | 9/2014 | Chan | .................. | G02B 27/0927 359/709 |
| 2016/0131900 A1 | 5/2016 | Pretorius | | |

OTHER PUBLICATIONS

Translation of International Preliminary Report on Patentability from international application PCT/EP20151076613 on which this application is based dated Jun. 22, 2017.

English translation and Office action of the Japanese Intellectual Property Office dated Aug. 6, 2019 in corresponding Japanese patent application JP 2017-530649.

English translation and Office action of the Japanese Intellectual Property Office dated Feb. 18, 2020 in corresponding Japanese patent application JP 2017-530649.

* cited by examiner

OBJECTIVE LENS FOR A STILL OR FILM CAMERA AND METHOD FOR SELECTIVE DAMPING OF SPECIFIC SPATIAL FREQUENCY RANGES OF THE MODULATION TRANSFER FUNCTION OF SUCH AN OBJECTIVE LENS

CROSS REFERENCE TO RELATED APPLICATIONS

This application is a continuation application of international patent application PCT/EP2015/076613, filed Nov. 13, 2015, designating the United States and claiming priority from German application 10 2014 118 383.5, filed Dec. 11, 2014, and the entire content of both applications is incorporated herein by reference.

FIELD OF THE INVENTION

The present invention relates to a lens for a still or film camera and to a still or film camera. Moreover, the invention relates to a method for targeted damping of specific spatial frequencies of the modulation transfer function of a lens for a still or film camera.

BACKGROUND OF THE INVENTION

By now, modern still and film cameras have such high-resolution image sensors (for example, so-called "4K" (approximately 3840×2160 pixels) or even "8K" (approximately 7680×4320 pixels) in the case of film cameras and up to 40 megapixels in the case of single-lens reflex cameras) that the image sharpness achieved thereby in conjunction with lenses of the highest image quality may even be bothersome in various application scenarios. Although the full image resolution is desired for specific film genres or specific scenes, for example for nature or landscape recordings, it may have a bothersome effect in other scenes, for example portraits.

In order to reduce a bothersome sharpness, cameras may be provided with devices for obtaining an adjustable soft focus effect, for example using software which electronically blurs a recorded image. However, electronic blurring is not comparable with purely optical blurring as the distance of the object from the lens is also incorporated into the result in the case of the purely optical blurring and hence a type of three-dimensional effect arises.

Purely optical blurring may be achieved using so-called soft focus lenses which typically have adjustable air gaps in the lens. However, such soft focus lenses also have unwanted side effects since field-dependent image aberrations such as coma or astigmatism are generated. Moreover, in this implementation, it is difficult, as a result of variable air gaps, to prevent an occurrence of defocusing in addition to the desired spherical aberration, it only being possible to compensate the defocusing with much outlay by way of data tables and a complicated structure of the system. Hence, on account of the existing coupling between the soft focus effect and the field-dependent image aberrations, lenses with adjustable air gaps do not reach the original maximum image sharpness of the lens, or only do so with significant additional outlay, that is, with additional lens elements.

SUMMARY OF THE INVENTION

It is therefore an object of the present invention to provide a lens for still or film cameras, via which a soft focus effect may be realized in an advantageous manner.

A further object of the present invention is that of providing an advantageous still or film camera.

Finally, it is an even further object of the present invention to provide an advantageous method for targeted damping of specific spatial frequency regions of modulation transfer functions of a lens for still or film cameras.

A lens according to the invention for a still or film camera includes a first lens-element arrangement, at least a second lens-element arrangement, and at least a wavefront manipulator. Here, the first lens-element arrangement and the second lens-element arrangement may each have either a single lens element or, preferably, a plurality of lens elements. The first lens-element arrangement and the second lens-element arrangement are arranged spaced apart from one another along an optical axis of the lens such that an interstice is present between the first lens-element unit and the second lens-element unit. The wavefront manipulator is situated in this interstice. It includes at least two optical components which are arranged in a manner displaceable counter to one another, perpendicular to the optical axis of the lens, and which each have a free-form surface. The wavefront manipulator has a zero position, in which the optical components thereof do not cause any image aberrations in the imaging properties of the lens. Moreover, the wavefront manipulator has effective positions, in which the optical components are displaced from the zero position counter to one another, perpendicular to the optical axis of the lens, and in which the optical components cause at least a spherical aberration in the imaging properties of the lens.

In the lens according to the invention, the wavefront manipulator renders it possible to influence the spherical aberration at a predetermined reference wavelength in a targeted manner and, in the process, leave other monochromatic image aberrations such as coma and astigmatism uninfluenced. In particular, any fixedly predetermined linear combination of Zernike coefficients (Z9, Z16, Z25 and also possibly higher terms) which describe the various orders of spherical aberration may be influenced in an adjustable manner with the aid of the wavefront manipulator. In this way, it is possible to influence specific spatial frequency regions of the modulation transfer function (for example, above ten line pairs per millimeter) in the lens according to the invention in a targeted manner and, in particular, also dampen these in a suitable manner such that a soft focus effect, which is adjustable in terms of strength, arises. Moreover, the sign of the produced spherical aberration may be reversed without problems, as a result of which different effects emerge in the foreground and background, which effects may likewise be used for artistic purposes. Here, the sign is reversed by reversing the movement direction of the optical components of the wavefront manipulator. By contrast, soft focus lenses according to the prior art often do not allow the sign of the spherical aberration to simply be reversed. With the aid of the lens according to the invention, it is possible to obtain a large adjustment range with a very homogeneous imaging characteristic, and this may be obtained for virtually any lens type and hence for a complete focal length series.

Moreover, the configuration of the lens according to the invention renders it possible to convert any lens having a suitable interstice between the first lens-element arrangement and the second lens-element arrangement into a lens according to the invention with the aid of a wavefront manipulator. By contrast, in the soft focus lenses according to the prior art, tunable air gaps must be provided a priori in the optical and mechanical structure, and so retrofitting a lens without a soft focus effect to form a soft focus lens according to the prior art is not possible. Moreover, the construction outlay when constructing soft focus lenses according to the prior art is higher than in the case of a lens according to the invention on account of taking the air gaps into account a priori in the optical and mechanical structure.

Image aberrations are classified proceeding from paraxial optics. In paraxial optics, only those light rays which have a small distance from the optical axis and at most have a small angle in relation to the optical axis are considered (such that the approximation $\sin\theta \approx \tan\theta \approx \theta$ may be used). Here, the sine of the angle in relation to the optical axis is approximated by the first member of a Taylor expansion. No image aberrations occur in this approximation. If one goes beyond paraxial optics, higher terms of the Taylor expansion of the sine of the angle are taken into account. Here, the next higher term is the third power of the angle, the following next higher term is the fifth power of the angle. Evermore odd terms of the angle occur in a further expansion. A spherical aberration which emerges from the second term of the Taylor expansion, that is, the term with the third power of the angle, is referred to as third order spherical aberration, a spherical aberration which emerges from the third term of the Taylor expansion, that is, the term with the fifth power of the angle, is referred to as fifth order spherical aberration, and so on.

In the lens according to the invention, the wavefront manipulator, in the effective positions of its optical components, causes at least a third order spherical aberration in the imaging properties of the lens. Additionally, or alternatively, the wavefront manipulator, in the effective positions of its optical components, causes at least a fifth order spherical aberration in the imaging properties of the lens.

In an advantageous configuration of the lens according to the invention, the free-form surfaces are defined in a Cartesian coordinate system having an x-axis, a y-axis, and a z-axis, wherein the z-axis represents the optical axis of the lens and the z-coordinates of a free-form surface are described depending on the x- and y-coordinates by a polynomial expansion of the form $$z = \sum_{m,n=0}^{\infty} C_{m,n} x^m y^n$$

Here, $C_{m,n}$ denotes the expansion coefficient of the polynomial expansion of the respective free-form surface of order m in respect of the x-coordinate and of order n in respect of the y-coordinate. Here, the movement direction of the optical components with the free-form surfaces extends parallel to the y-axis. In this representation of the free-form surfaces, only polynomials of odd order n and of even order m have expansion coefficients $C_{m,n}$ that differ from zero. Although this representation of the free-form surfaces is not the only possible representation, it facilitates a relatively simple calculation of the surfaces required for causing the spherical aberration.

If at least the expansion coefficients of the polynomials $x^4y$, $x^2y^3$ and $y^5$ differ from zero, it is possible to cause a third order spherical aberration. A fifth order spherical aberration may be caused if at least the expansion coefficients of the polynomials $x^6y$, $x^4y^3$, $x^2y^5$ and $y^7$ differ from zero. In particular, both a third order spherical aberration and a fifth order spherical aberration may be caused if the two aforementioned groups of polynomials have coefficients that differ from zero. If, moreover, the expansion coefficients of the polynomials $x^2y$ and $y^3$ differ from zero, it is also possible to cause a defocus in addition to the third and/or fifth order spherical aberration by displacing the optical components with the free-form surfaces counter to one another. Via this defocus, it is possible to avoid refocusing in the case of a change in the aperture. In addition to the defocus, or as an alternative thereto, it is also possible to realize a so-called tilt term if the expansion coefficient of the polynomial y also differs from zero. Such a tilt term, the optical effect of which is close to zero, may be used to keep the mean profile depth small and thus facilitate a flat form of the free-form profiles.

A physical aperture stop may be situated in the interstice between the first lens-element arrangement and the second lens-element arrangement of the lens according to the invention. Then, the wavefront manipulator is situated in front of or behind the physical aperture stop. If a substantially diffraction-limited image quality should be obtained in the zero position of the wavefront manipulator, the wavefront manipulator is situated as close as possible to the stop and, where possible, in a collimated beam path. By contrast, in the case of lenses whose correction is far away from the diffraction limit, greater distances of the wavefront manipulator from the aperture stop are also possible. The maximum admissible deviations from the collimation condition in this case depends on numerous parameters, such as, in particular, the f-number of the lens, the adjustment range of the wavefront manipulator, and the image quality demand. Arranging the wavefront manipulator in the collimated beam path is advantageous in that, in that case, the angles of incidence on the free-form surfaces become relatively small and asymmetric aberrations induced thereby are minimized. Induced asymmetric image aberrations may occur if the ray incidence heights at the first free-form surface and at the second free-form surface have an offset in the case of a finite distance between the elements. Here, the offset becomes larger with increasing distance between the elements and increasing angle of incidence of the rays on the free-form surfaces. In the case of an arrangement in the collimated beam path, the angles of incidence of the rays equal zero for the central beam and they are at least minimized for the field-dependent beams, and so induced asymmetric aberrations are suppressed. It should be noted here that it is obvious to a person skilled in the art that it is not possible to produce an exactly collimated beam path with an optical system, but that it may only be produced approximately.

Instead of a physical aperture stop, a virtual aperture stop also may be situated in the interstice between the first lens-element arrangement and the second lens-element arrangement. In this case, the wavefront manipulator may be arranged immediately at the location of the virtual aperture stop, and so the greatest possible stop proximity of the wavefront manipulator may be realized in this configuration.

In an advantageous embodiment of the lens according to the invention, the latter includes a detection unit for detecting at least an influential variable of the lens, which is relevant to ascertaining a suitable effective position of the optical components of the wavefront manipulator. Moreover, the lens includes a calculation unit for calculating the displacement paths of the optical components of the wavefront manipulator for reaching the effective position proceeding from the zero position on the basis of the detected influential variable and the desired degree of spherical aberration, or such a calculation unit is assigned to the lens. Here, typical influential variables are the stop position and the distance setting of the lens. The calculation unit may be a measuring module, for example in the form of an EPROM, securely connected to the lens, the measuring module containing a characteristic for the required manipulated variables depending on the desired effect of the wavefront manipulator and the stop position and distance position present in each case. Alternatively, the calculation unit may also be software which is run by the control electronics of the camera.

In order to be able to refocus, where necessary, in the case of a change in the aperture, the lens may include an actuation system for displacing at least a part of one of the lens-element arrangements along the optical axis. A suitable actuation system may also be present for displacing the optical components counter to one another, with the free-form surfaces perpendicular to the optical axis. Here, in particular, this may be an actuation system with electrically actuatable actuators, the actuators realizing the actuator travels calculated by the calculation unit. By way of example, micro-motors, ultrasonic motors or piezoelectric actuators may be used as actuators.

In the lens according to the invention, the optical components with the free-form surfaces may be produced from a material with a deviation in the refractive index dispersion from the normal line. Such a deviation of the refractive index dispersion from the normal line leads to abnormal partial dispersion, as may be realized, for example by the use of long crown or short flint glasses. In this configuration, it becomes possible to set secondary chromatic aberrations in a targeted manner.

An immersion medium may be situated between the optical components with the free-form surfaces. As a result, it becomes possible to set a predetermined wavelength-dependence of the spherical aberration caused by the wavefront manipulator. In particular, for example, an achromatic effect of the wavefront manipulator, that is, an at least virtually equal effect for all wavelengths of a wavelength region, may be obtained. Here, the immersion medium may have a dispersion curve deviating from the normal line, as a result of which it becomes possible to set secondary achromatic aberrations in a targeted manner. By combining suitable materials of the optical components having an abnormal partial dispersion with immersion media which have an abnormal partial dispersion, it becomes possible to set tertiary chromatic aberrations using the wavefront manipulator.

In principle, it is also possible to combine a plurality of wavefront manipulators with one another in the lens according to the invention such that, for example, a wavefront manipulator for setting the third order spherical aberration and a further wavefront manipulator for setting the fifth order spherical aberration are present. As a result, it becomes possible to provide an exactly equal ratio of third order spherical aberration to fifth order spherical aberration at each stop position, even though the fifth order spherical aberration is reduced faster than the third order spherical aberration when stopping down the lens. However, an additional wavefront manipulator may also be introduced into the interstice between the lens-element arrangements for it to become possible to set a chromatic aberration such as, for example, a longitudinal chromatic aberration or a Gaussian aberration. In that case, this additional wavefront manipulator may also include optical components made of a material with an abnormal partial dispersion and/or an immersion medium with an abnormal partial dispersion or without an abnormal partial dispersion.

In the lens according to the invention, it is advantageous if the at least one wavefront manipulator is removable from the lens. Thus, the lens may also be used without the wavefront manipulator, with the lens having an ideal imaging sharpness. Then, the wavefront manipulator may be inserted into the lens as an add-on module where necessary, so as to facilitate targeted bringing about of a spherical aberration.

As already described, the lens according to the invention may be used for blurring by bringing about a targeted spherical aberration. However, it is also possible to bring about bokeh. In particular, what should be highlighted here is that the lens according to the invention opens up the possibility of blurring either the foreground or the background of the object with the aid of a negative spherical aberration or a positive spherical aberration by virtue of the movement direction of the optical components with the free-form surfaces being reversed.

Finally, bringing about a targeted spherical aberration may also be used for bringing about anti-aliasing. Then, it is possible to dispense with a low-pass filter, which, as a rule, is used in the prior art for anti-aliasing. Alternatively, remaining residual structures may be suppressed if low-pass filters are used. Moreover, particularly when dispensing with the low-pass filter made of a stack of birefringent plates, it is possible to suppress interfering moiré effects or unwanted fine image structures on a suitable display or monitor already directly before the recording and hence it is possible to set a desired image effect in a targeted manner.

Since different camera manufacturers use filter plates with different thicknesses (or else filter plates made of materials with different refractive indices) for anti-aliasing purposes, a different spherical aberration remains at the image center if the same lens is used in different cameras. In the lens according to the invention with the variable setting of the spherical aberration, this aberration may be compensated for in the respective camera. Moreover, according to the invention, a method for targeted damping of specific spatial frequency regions of the modulation transfer function of a lens according to the invention is provided. In this method, a spherical aberration, in particular a third order spherical aberration and/or a fifth order spherical aberration, is brought about in a targeted manner by displacing the free-form surfaces counter to one another, perpendicular to the optical axis of the lens. The advantages which are obtainable with the method have already been described with reference to the lens according to the invention.

Further features, properties and advantages of the present invention will become apparent from the following embodiments with reference to the accompanying figures.

BRIEF DESCRIPTION OF THE DRAWINGS

The invention will now be described with reference to the drawings wherein.

DESCRIPTION OF THE PREFERRED EMBODIMENTS OF THE INVENTION

Below, a lens according to the invention is initially described in terms of the essentials thereof on the basis of FIGS. 1 to 5, before specific embodiments for the lens according to the invention are described.

Figure 1:
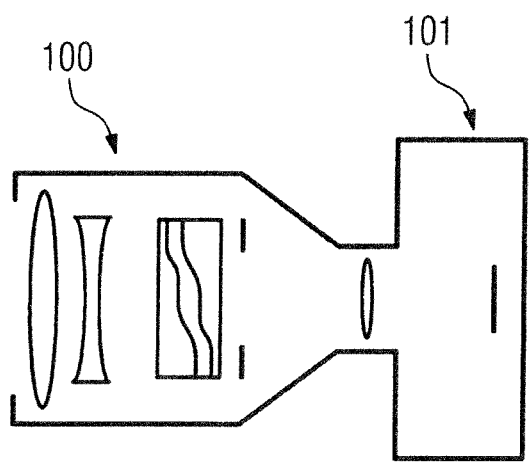
FIG. 1 shows, schematically, a still camera having a lens according to the invention with a wavefront manipulator.
Figure 2:
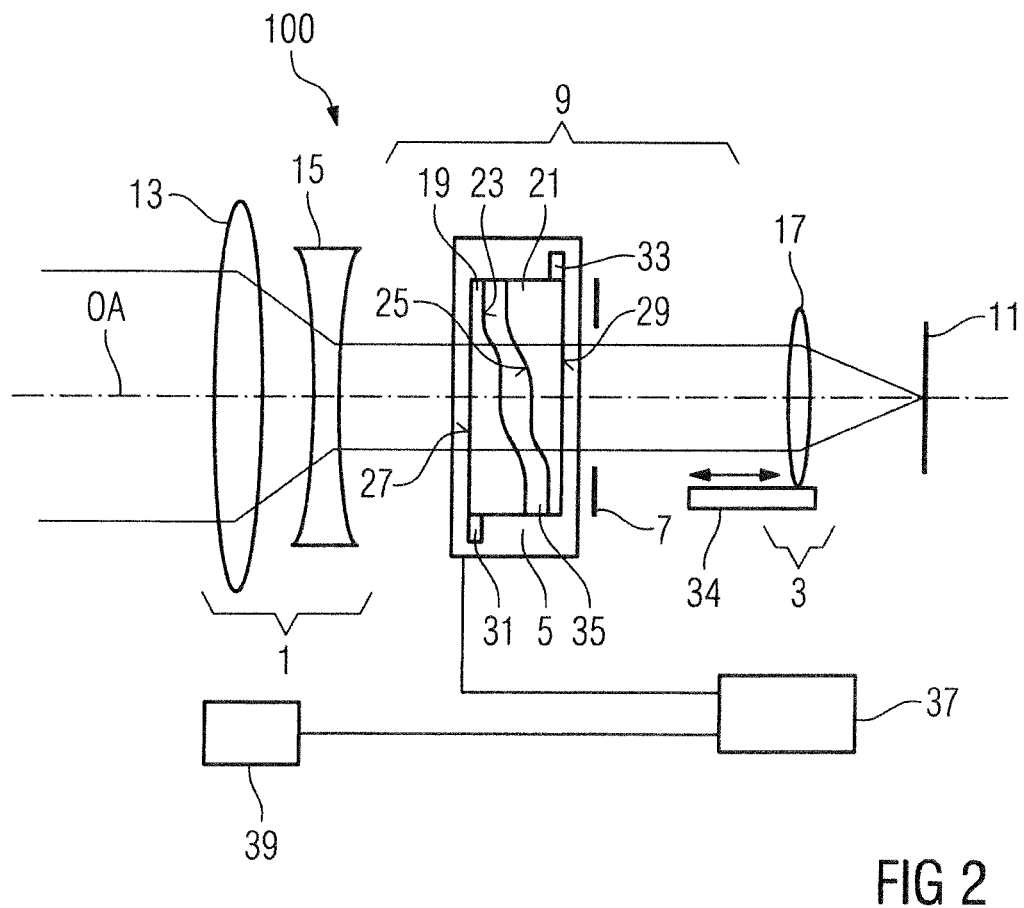
FIG. 2 shows the optical and electronic components of a lens according to the invention in a schematic illustration.

A lens 100 according to the invention is depicted schematically in FIG. 1 together with a camera 101. The optical components and the electronic components of the lens 100 are depicted in FIG. 2 together with the image plane of the camera. The lens 100 includes a first lens-element arrangement 1, at least a second lens-element arrangement 3 and at least a wavefront manipulator 5, which is arranged in close proximity to an aperture stop 7 in the present embodiment. Both the wavefront manipulator 5 and the aperture stop 7 are situated in an interstice 9 between the first lens-element arrangement 1 and the second lens-element arrangement 3. Moreover, an image plane 11 is depicted; however, the latter is no longer part of the lens but already part of the still camera 101 or the film camera, on which the lens 100 is assembled.

In the embodiment depicted in FIG. 2, the first lens-element arrangement 1 includes two lens elements 13, 15, of which the object-side lens element 13 is a converging lens element and the image-side lens element 15 is a diverging lens element. To the extent that a sufficiently large object distance is present, the first lens-element arrangement 1 produces a collimated, that is, parallel, beam path on the image side, the beam path finally being focused onto the image plane or sensor 11 by the second lens-element arrangement 3 which, in the present embodiment, merely includes a converging lens element 17. An actuator 34 is assigned to the second lens-element arrangement 3, the lens-element arrangement being able to be displaced along the optical axis by way of the actuator, for example in order to be able to refocus, where necessary, in the case of a change in the aperture. The possible displacement of the lens-element arrangement 3 is indicated in FIG. 2 by a double-headed arrow.

Both the aperture stop 7 and the wavefront manipulator 5 are arranged in the interstice 9, in which the collimated beam path is present. The arrangement in the collimated beam path and in the vicinity of the aperture stop 7 renders it possible to obtain a substantially diffraction-limited image quality with the lens when the wavefront manipulator 5 is in the zero position, as depicted in FIG. 2. Relatively large deviations both from the collimation condition and in terms of the distance of the wavefront manipulator 5 from the aperture stop 7 may be realized in the case of lenses whose correction lies far away from the diffraction limit. The explicit calculation of maximum admissible deviations from the collimation condition and the maximum admissible distance from the aperture stop is only possible on the basis of numerous parameters such as, for example, the f-number of the lens, the adjustment range of the manipulator, the image quality demand on the lens, et cetera.

The wavefront manipulator 5 will be explained in more detail below with reference to FIGS. 2 to 5. It includes a first optical component 19 and a second optical component 21, which may be displaced counter to one another in a plane perpendicular to the optical axis OA of the lens. The first optical component 19 and the second optical component 21 each have a free-form surface 23, 25. Moreover, the surface of the respective optical component 19, 21 facing away from the free-form surface 23, 25 is embodied as a plane surface 27 and 29, respectively. In the present embodiment, the optical components 19, 21 are oriented in such a way that the free-form surfaces 23, 25 thereof face one another. Here, the profiles of the free-form surfaces as seen from the object in the direction of the image are identical. Expressed differently, if the profiles are seen as a deviation from a mean plane surface, with a positive deviation being defined in the direction of the image and a negative deviation being defined in the direction of the object, the two free-form surfaces 23, 25 have the same deviations from this mean plane surface. Now, the difference between the two free-form surfaces only consists in the fact that the first free-form surface 23 marks the transition from the material of the first optical component to air and the second free-form surface 25 marks the transition from air to the material of the second optical component 21. Reference is made here to the fact that, in FIGS. 2 to 5, the deviations of the free-form surfaces from the mean plane surface and the distances between the optical components of the wavefront manipulator are depicted in a much-exaggerated manner for the purposes of improved presentability.

Figure 4:
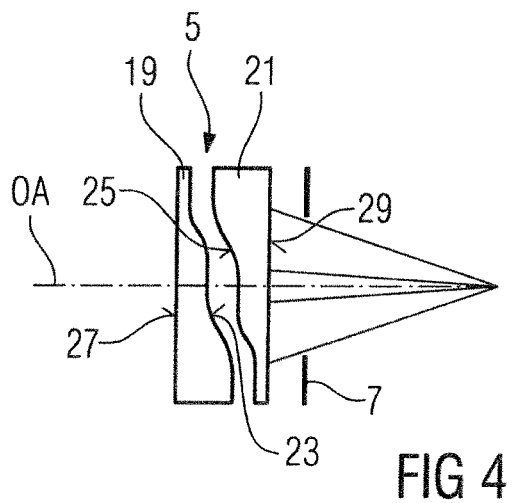

In FIGS. 2 and 4, the wavefront manipulator 5 is depicted in the zero position. In this position, the free-form surfaces 23 and 25 lie exactly opposite one another such that a narrow gap is formed between the two surfaces, with the same distance being present between the free-form surfaces 23 and 25 at each position of the gap. In this way, the wavefront manipulator 5 acts as an optical zero element since a refraction occurring at the first free-form surface 23 is compensated for again by the second free-form surface 25 by refraction running counter thereto. Therefore, as an optical zero element, the wavefront manipulator 5 in the zero position does not have any substantial effect on the imaging generated by the lens.

An actuator 31 and 33, respectively, is assigned to each optical component 19, 21 of the wavefront manipulator 5, with the aid of the actuator the optical components 19, 21 being able to be displaced counter to one another in a direction perpendicular to the optical axis OA. The directions of this displacement are labeled by arrows in FIGS. 3 to 5.

Figure 3:
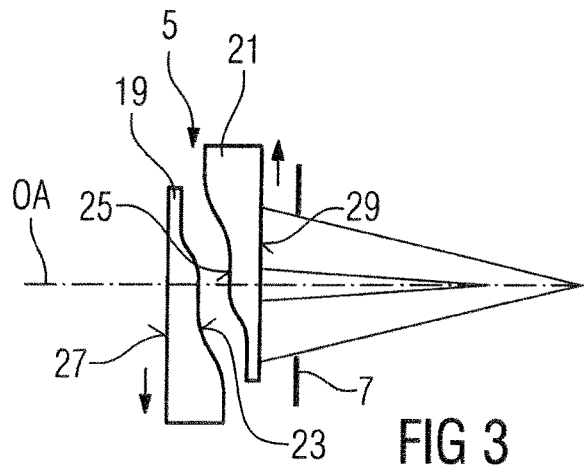
FIGS. 3 to 5 show the wavefront manipulator from the lens depicted in FIG. 1, in various positions of the optical components thereof.

If the wavefront manipulator is displaced out of the zero position shown in FIG. 4 into a first effective position, which is depicted in FIG. 3, the wavefront manipulator 5 has an increased distance in the axis-remote region of a bundle of rays passing through the wavefront manipulator 5. Moreover, the free-form surfaces in the first effective position have different curvatures at the points lying opposite one another. In the first effective position, depicted in FIG. 3, the curvatures are such that axis-remote rays are focused less strongly than near-axis rays such that the back focus of axis-remote rays is increased in relation to near-axis rays (depicted in exaggerated fashion in the figure). In this way, the wavefront manipulator causes a negative spherical aberration in the imaging.

Figure 5:
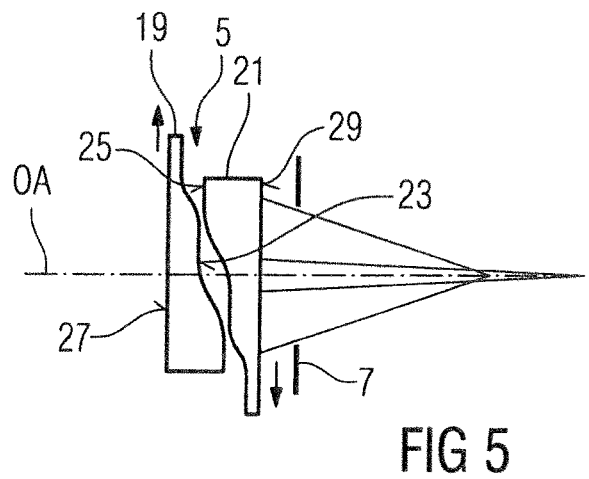

In the effective position shown in FIG. 5, in which the optical components 19, 21 of the wavefront manipulator 5 are likewise displaced counter to one another, but in opposite directions in comparison with FIG. 3, the free-form surfaces 23, 25 lie opposite one another in such a way that axis-remote rays of a bundle of rays are focused more strongly than near-axis rays (depicted in exaggerated fashion in the figure). As a result, the back focus of axis-remote rays is reduced in relation to the back focus of near-axis rays, and so a positive spherical aberration is caused. Thus, by displacing the optical components with the free-form surfaces counter to one another, a positive spherical aberration or a negative spherical aberration may be caused with a wavefront manipulator according to the invention, depending on whether the first optical component is displaced in the negative direction and the second optical component is displaced in the positive direction, or vice versa. Here, a third order spherical aberration, a fifth order spherical aberration or a higher order spherical aberration may be caused, depending on the selected free-form profile. Moreover, it is possible to configure the free-form surfaces in such a way that, at the same time as a third order spherical aberration, at least a fifth order spherical aberration is caused as well. It is likewise possible to construct the free-form surfaces in such a way that other optical aberrations are also caused in addition to a spherical aberration.

An optional immersion medium 35 is arranged between the free-form surfaces 23, 25 of the optical components 19, 21 of the wavefront manipulator 5 in the embodiment shown in FIG. 2. In particular, this immersion medium may be a liquid or an elastic polymer. By way of example, liquids, such as ultrapure water, saline solutions, immersion oils, et cetera, and elastic optokits are considered as immersion medium. Since there merely is a lateral movement of the first optical component and of the second optical component, the wavefront manipulator with immersion medium may have a flat construction, that is, a small extent in the direction of the optical axis OA. By suitably matching the refractive index and the Abbe number of the immersion medium to the refractive index and the Abbe number of the material from which the optical components are produced, it is possible to achieve a variably adjustable wavefront manipulation, the effect of which is independent of the wavelength over an extended wavelength range, and so the wavefront manipulator 5 may be considered to be an achromatic wavefront manipulator. With the aid of the achromatic wavefront manipulator, it is possible to largely avoid chromatic aberrations, in particular longitudinal chromatic aberrations, when causing the spherical aberration.

If the immersion medium 35 or the material of the first optical component 19 and of the second optical component 21 of the wavefront manipulator 5 has a dispersion curve deviating from the normal line, it is likewise possible to correct higher orders of the chromatic aberrations, that is, secondary and tertiary spectra of the chromatic aberrations. Here, for the purposes of correcting the tertiary chromatic aberration, both the immersion medium 35 and the material of the optical components 19, 21 of the wavefront manipulator 5 have a dispersion curve deviating from the normal line. Immersion media are typically hydrocarbons which, as such, have a dispersion curve which, as a rule, deviates from the normal line.

Using the wavefront manipulator 5, the spherical aberration is caused by manipulating the wavefront of the beam passing through the wavefront manipulator. The wavefront of a beam is given by the points of the electromagnetic wave which have the same phase. Mathematically, the wavefront may be represented by a superposition of functions of a complete function system. Typically, Zernike polynomials are used as a function system, with the individual Zernike polynomials representing various image aberrations. Here, in the representation of the wavefront, each Zernike polynomial is assigned a Zernike coefficient, with the wavefront being described by the Zernike coefficients. The free-form surfaces 23, 25 of the optical components 19, 21 of the wavefront manipulator 5 may be selected in such a way that they generate a manipulation of the wavefront which may be described by a Zernike polynomial. The associated Zernike coefficient is determined by the absolute value of the relative displacement of the two optical components 19, 21. A mathematical equivalent description may also be obtained by the expansion according to other complete function systems, for example by a Taylor expansion. Below, the fundamental principles for constructing the free-form profiles are explained on the basis of a Taylor expansion.

In the case of an explicit surface representation in the form z(x,y), the free-form surface may be described by a polynomial which only has even powers of x in an x-coordinate perpendicular to the movement direction of the optical components 19, 21 and only has odd powers of y in a y-coordinate parallel to the movement direction. Initially, the z(x,y)-coordinate of the free-form surface may be described in general, for example, by a polynomial expansion of the form $$z = \Sigma_{m,n=0}^{\infty} C_{m,n} x^m y^n \quad (1),$$

where Cm,n denotes the expansion coefficient of the polynomial expansion of the free-form surface of order m in respect of the x-direction and of order n in respect of the y-direction. Here, x, y and z denote the three Cartesian coordinates of a point lying on the surface in the local surface-related coordinate system. Here, the coordinates x and y should be inserted into the equation as dimensionless indices in so-called lens units. Here, lens units means that all lengths are initially specified as dimensionless numbers and subsequently interpreted in such a way that they are multiplied throughout by the same unit of measurement (nm, μm, mm, m). The background for this is that geometric optics are scale-invariant and, in contrast to wave optics, do not possess a natural unit of length.

According to the teaching by Alvarez, a pure defocusing effect may be obtained if the free-form surface of the optical components 19, 21 can be described by the following 3rd order polynomial:

$$z(x, y) = K \cdot \left( x^2 \cdot y + \frac{y^3}{3} \right). \quad (2)$$

Here, the assumption is made that the lateral displacement of the optical components 19, 21 occurs along the y-axis, which is defined thereby. Should the displacement occur along the x-axis, the role of x and y should accordingly be interchanged in the equation above. As it were, the parameter K scales the profile depth and thus sets the obtainable change in refractive power per unit of the lateral displacement path s.

For beams incident parallel to the optical axis OA and for air (refractive index n=1) between the two optical components 19, 21, the lateral displacement of the optical components by a path s=|±y| thus brings about a change in the wavefront in accordance with the following equation:

$$\Delta W(x, y) = K \cdot \left( 2 \cdot s \cdot (x^2 + y^2) + 2 \cdot \frac{s^3}{3} \right), \quad (3)$$

that is, a change in the focal position by changing the parabolic wavefront component plus a so-called piston term (Zernike polynomial with j=1, n=0 and m=0), where the latter corresponds to a constant phase and precisely does not have an effect on the imaging properties if an optical element according to the invention is situated in the infinite beam path, that is, in the region of a collimated beam. Otherwise, the piston term may usually also be ignored for the imaging properties. Further details for constructing the free-form surfaces, via which the variable refractive power effect may be obtained, are described in U.S. Pat. No. 3,305,294. Reference is made to this document in respect of the construction of the free-form surfaces.

The surface refractive power of such a wavefront manipulator acting as a zoom lens is given by the following equation:

$$\Phi_v = 4 \cdot K \cdot s \cdot (n-1) \quad (4).$$

Here, s is the lateral displacement path of an element along the y-direction, K is the scaling factor of the profile depth and n is the refractive index of the material from which the lens is formed, at the respective wavelength.

It is possible that the two optical components 19, 21, which are moved relative to one another, are oriented as shown in FIGS. 2 to 5 in such a way that the two free-form surfaces 23, 25 face one another. In this case, it is particularly simple to undertake an adjustment of the zero position, namely by virtue of reducing the distance between the two optical components 19, 21 until the two components are in contact. Centering of the optical components occurs automatically in this position. Subsequently, the distance in the axial direction may be enlarged again, just so far that the two optical components 19, 21 just do not contact one another within the scope of the lateral movement during the operation as intended. However, alternatively, it is also possible, as a matter of principle, to orient the two optical components 19, 21 in such a way that the free-form surfaces 23, 25 face away from one another.

In the present invention, the free-form surfaces have higher order terms for influencing individual image aberrations. These may be present on their own or in addition to other terms, for example the described defocus term or the described piston term. By way of example, a 5th order polynomial of the form $$z(x, y) = K \cdot \left( y \cdot x^4 + \frac{2}{3} \cdot (x^2 \cdot y^3) + \frac{y^5}{5} \right) \quad (5)$$

would predominantly influence the primary spherical aberration. A 5th order spherical aberration is described by a corresponding 7th order polynomial, and so on.

The structure profiles may be freely superposed, that is, a structure for changing the refractive power and a structure for changing the spherical aberration may be superposed in a free-form surface 23, 25 such that a corresponding wavelength manipulator varies a refractive power effect during the displacement of the optical components 19, 21 counter to one another and, at the same time, changes a spherical aberration, with both changes being proportional to one another with any proportionality factor, although the latter having to be fixedly selected in advance.

Furthermore, it is also possible for both sides of the moved optical components 19, 21 to have an effective form in accordance with the above-described free forms. By way of example, a symmetric subdivision of the surface profile between the front and rear surface of a component in accordance with the equation above could cause the profile depths on each surface to remain sufficiently small such that, for example, a photolithographic production of the elements, which typically only facilitates maximum profile depths in the region <10-30 µm, is made easier. In addition to the easier production, smaller profile depths, as a matter of principle, also offer the advantage that they cause fewer unwanted image aberrations in comparison with larger profile depths. Unwanted image aberrations arise at the profiles of the optical components of a free-form element on account of the finite distance between the optical components, leading to a beam which is refracted at the free-form surface of the first optical component at a certain distance from the optical axis not impinging on the second free-form surface exactly at the point corresponding thereto, but rather with a slight offset. The aberrations arising here increase drastically with the profile depth (more than linearly) because larger profile depths not only have a larger refractive effect but, moreover, require a greater distance between the elements. Thus, splitting the free-form profiles between the front and rear side of the free-form elements is always advantageous from an optical point of view, even though this is more complicated in terms of production.

According to Lohmann (cf. Appl. Opt. Vol. 9, No 7, (1970), p. 1669-1671), it is possible to present a zoom lens largely equivalent to the teaching of Alvarez, in which two free-form surfaces for example, in the lowest order are described by an equation of the form $$z(x,y) = A \cdot (x^3 + y^3) \quad (6)$$

and the relative movement of the optical components in relation to one another is carried out along a straight line, perpendicular to the optical system axis, extending at 45° in relation to the x- and y-axis. Here, the constant A once again is a free scaling constant, which describes the maximum profile depth of the free-form surface and, as a result thereof, the refractive power change per unit path length. The description according to Lohmann is not an independent solution, but instead substantially only an alternative representation.

Below, matching an immersion medium 35 situated between the optical components 19, 21 to the material of the optical components 19, 21 is described.

For the provision of an achromatic zoom lens, the condition for matching the immersion medium 35 to the material of the optical components 19, 21 in the wavefront manipulator 5 may be derived as follows:

The two optical components 19, 21 moved in relation to one another form a refractive power $\Phi_1 = 4 \cdot k \cdot s \cdot (n_1 - 1)$. The variable "immersion medium lens", that is, the variable interstice filled with the immersion medium 35, between the plates forms a refractive power $-\Phi_2 = 4 \cdot k \cdot s \cdot (n_2 - 1)$, where k denotes the scaling factor of the free-form profile function, s denotes the displacement path of the elements $n_1$ and $n_2$ denote the refractive indices of the material of the optical components 19, 21 and of the immersion medium 35, respectively, at a mid-wavelength of the considered spectral range.

In general, the condition for achromatism for two lenses closely next to one another is:

$$\frac{\Phi_1}{v_1} + \frac{\Phi_2}{v_2} = 0. \tag{7}$$

Here, $n_1$ and $n_2$ denote the Abbe number of the material of the optical components 19, 21 and the Abbe number of the immersion medium 35, respectively. By inserting the equations for the refractive powers $\Phi_1$ and $\Phi_2$ into equation (7), the following condition may be arrived at for the achromatic zoom lens:

$$\frac{n_1 - 1}{v_1} - \frac{n_2 - 1}{v_2} = 0. \tag{8}$$

Naturally, there may also be a small deviation from the condition above in practice on account of the only restricted selection of available optical materials, in particular when taking into account specific requirements such as durability, thermal expansion, et cetera, without departing from the scope of the invention. A parameter range for a zoom lens may be approximately characterized by the following conditions:

$$\left|\frac{n_1 - 1}{v_1} - \frac{n_2 - 1}{v_2}\right| = < 0.05. \tag{8a}$$

Preferably, even the following should apply:

$$\left|\frac{n_1 - 1}{v_1} - \frac{n_2 - 1}{v_2}\right| = < 0.01. \tag{8b}$$

Even more preferably, the following may apply:

$$\left|\frac{n_1 - 1}{v_1} - \frac{n_2 - 1}{v_2}\right| = < 0.001. \tag{8c}$$

An achromatic wavefront manipulator which, in place of defocusing, should influence a specific Zernike term should likewise meet the same achromatization condition (7) or (8a) to (8c). An element which, for example, provides a specific absolute value of spherical aberration in a wavelength-independent manner should be provided by two optical components 19, 21, the free-from surfaces 23, 25 of which are for example embodied in accordance with equation 5 and which are formed from a glass which, together with the immersion medium 35, meets the condition (7) or (8a) to (8c).

As already mentioned, actuators 31, 33 are present for the purposes of setting the suitable displacement path of the two optical components 19, 21, the actuators being able to be embodied, for example, as micromechanical actuators, piezoelectric actuators, ultrasonic actuators, et cetera. Actuating signals for the actuators 31, 33 are calculated by a calculation unit 37 which, in the present embodiment, is integrated into the lens. However, it is alternatively also possible to configure the calculation unit 37 as software which is run by the control electronics of the camera. While the calculation unit is part of the lens in the first case, it would be part of the camera in the latter case.

From a detection unit 39 connected therewith, the calculation unit 37 receives the influential variables relevant for the calculation of the displacement paths. By way of example, the position of the stop 7 and the focusing setting of the lens are relevant influential variables. Therefore, the detection unit 39 is connected to sensors which are suitable for detecting these variables. Typically, such sensors are present in modern lenses as standard and are therefore not explained in any more detail here. The actuating signals calculated on the basis of the influential variables received by the detection unit 39 are then output from the calculation unit 37 to the actuators 31, 33 of the wavefront manipulator 5, the latter converting the actuating signals into the displacement paths represented by the actuating signals.

The lens from FIG. 2 is configured in such a way that the wavefront manipulator 5 may be removed from the interstice between the first lens-element arrangement 1 and the second lens-element arrangement 3. This also offers the option of using the lens without a wavefront manipulator if no spherical aberration should be induced (wavefront manipulator in the zero position), since the wavefront manipulator in the zero position does not exert any optical function as an optical zero element. Moreover, it is possible to replace the wavefront manipulator by another wavefront manipulator. By way of example, there thus may be a set of wavefront manipulators including at least two wavefront manipulators, of which one causes a third order spherical aberration with at least one further aberration and another one causes a third order spherical aberration without a further aberration. By way of example, it is possible to provide a wavefront manipulator which only causes a third order spherical aberration and a wavefront manipulator which, in addition to the third order spherical aberration, also still causes a fifth order spherical aberration and/or a defocus, the fifth order spherical aberration and/or the defocus having a specific relationship to the third order spherical aberration. It is likewise possible to provide a wavefront manipulator which, in addition to the spherical aberration, causes a different monochromatic aberration. A further option consists of providing a wavefront manipulator which, for example, with the aid of glasses with abnormal partial dispersion and/or an immersion media with abnormal partial dispersion, causes an achromatic spherical aberration. Provided the interstice 9 between the first lens-element arrangement 1 and the second lens-element arrangement 3 is large enough, it is also possible to arrange two such wavefront manipulators in the lens. Naturally, this also applies if the lens does not allow the removal of a wavefront manipulator. However, in the case of a lens with a removable wavefront manipulator, the lens may be provided with a whole set of electively insertable wavefront manipulators.

Even though the optical components 19, 21 in the wavefront manipulator in an embodiment are arranged in such a way that the free-form surfaces 23, 25 thereof face one another, it is also possible to arrange the optical components in such a way that the free-form surfaces thereof face away from one another. In FIGS. 2 to 5, the free-form surfaces would then be arranged on the outer sides of the wavefront manipulator and the plane surfaces on the mutually facing sides of the optical components. Moreover, it is possible to divide the optical effect of the free-form surfaces between two surfaces such that both sides of the optical components are provided with free-form surfaces, with the two free-form surfaces of an optical component together causing an effect as described with reference to FIGS. 2 to 5.

Figure 6:
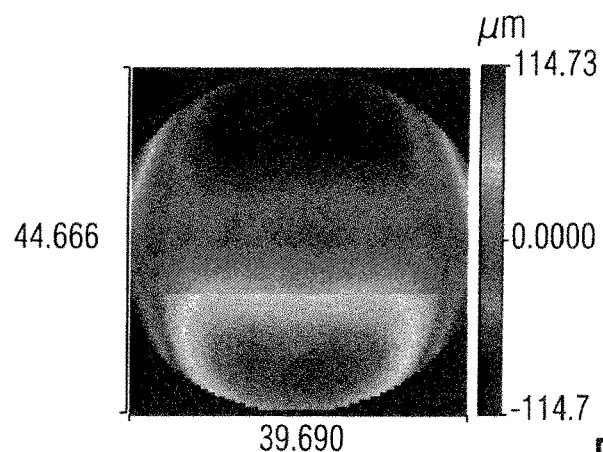
FIG. 6 shows the profile of the free-form surface of an optical component of the wavefront manipulator in accordance with a first embodiment for the lens according to the invention.
Figure 7:
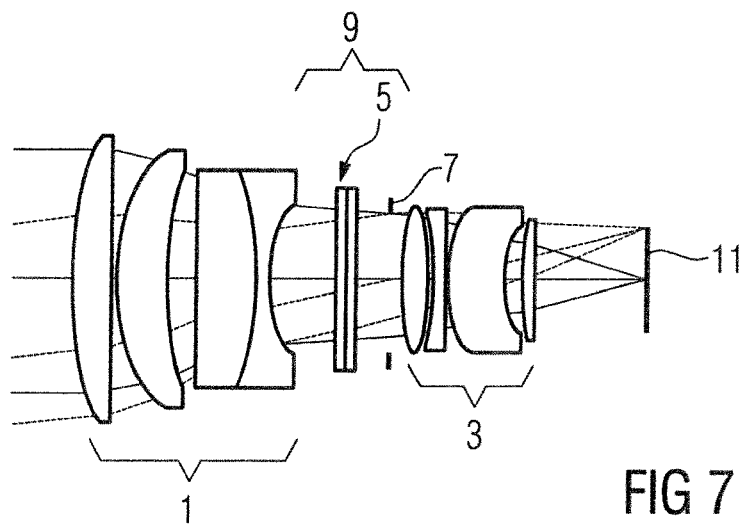
FIG. 7 shows the lens of the first specific embodiment, with the wavefront manipulator in the zero position.
Figure 8:
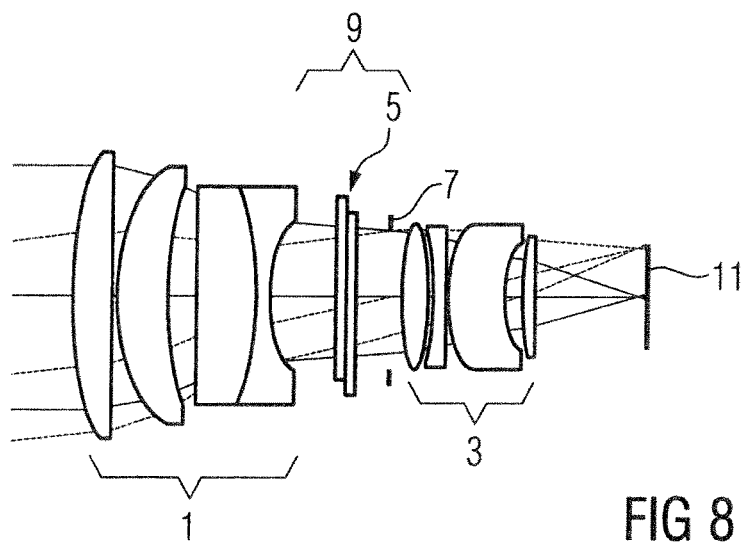
FIG. 8 shows the lens of the first specific embodiment, with the wavefront manipulator in an effective position.

A first embodiment for a wavefront manipulator according to the invention will be described below with reference to FIGS. 6 to 8. This embodiment specifies a lens for cine-applications, wherein lens is configured according to the invention. While FIG. 6 shows the profile of the free-form surfaces, FIGS. 7 and 8 show the lens with the wavefront manipulator 5 in the zero position (FIG. 5) and in an effective position with the maximum displacement of the optical components (FIG. 8).

Like the lens from the embodiment shown in FIG. 2, the lens of the first specific embodiment includes a first lens-element arrangement 1 and a second lens-element arrangement 3 which, however, in contrast to the embodiment shown in FIG. 2, is constructed from a plurality of lens elements. The wavefront manipulator 5 and the aperture stop 7 are arranged in the interstice 9 between the first lens-element arrangement 1 and the second lens-element arrangement 3.

The lens of the first specific embodiment has a focal length of 135 mm and a relative aperture of f/1.8. The main lens only includes spherical lenses, the surface of which is described by the conventional vertex form of the spherical equation (here: with k=0):

$$z = \frac{(x^2 + y^2)/R}{1 + \sqrt{1 - (1+k) \cdot \frac{(x^2+y^2)}{R^2}}}$$

The following table specifies the optical construction data for the first embodiment, wherein the surfaces in FIGS. 7 and 8 are numbered from left to right, with dummy surfaces being omitted. The radii and distances are specified in the table as dimensionless indices in so-called lens units, that is, all radii and distances may be interpreted in such a way that they are multiplied throughout by the same unit of measurement (nm, μm, mm, m). The background for this is that geometric optics are scale-invariant and, in contrast to wave optics, do not possess a natural unit of length. In the present specific embodiment, the unit of measurement is mm.

| Surface No. | Surface type | Surface radius | Distance to the next surface | Glass |
|---|---|---|---|---|
| Object | | | | |
| 1 | Sphere | 103.66 | 12.80 | NFK5 (Schott) |
| 2 | Sphere | −2511.900 | 0.30 | |
| 3 | Sphere | 51.212 | 16.40 | SFPL51 (Ohara) |
| 4 | Sphere | 127.720 | 8.00 | |
| 5 | Sphere | ∞ | 17.90 | NSF6 (Schott) |
| 6 | Sphere | −94.406 | 3.95 | SF2 (Schott) |
| 7 | Sphere | 38.861 | 18.1758 | |
| 8 | Sphere | ∞ | 3.00 | NLASF44 (Schott) |
| 9 | Free-form | — | 0.10 | |
| 10 | Free-form | — | 3.00 | NLASF44 (Schott) |
| 11 | Sphere | ∞ | 10.80 | |
| 12 (stop) | Sphere | ∞ | 1.00 | |
| 13 | Sphere | 65.407 | 7.80 | NPSK53 (Schott) |
| 14 | Sphere | −118.850 | 2.00 | |
| 15 | Sphere | −82.343 | 3.60 | SF1 (Schott) |
| 16 | Sphere | 473.150 | 0.20 | |
| 17 | Sphere | 34.475 | 17.30 | NFK5 (Schott) |
| 18 | Sphere | 26.416 | 5.17 | |
| 19 | Sphere | 109.020 | 3.90 | NSF6 (Schott) |
| 20 | Sphere | 2511.900 | 33.9542 | |
| Image | | | | |

Here, the wavefront manipulator 5 includes exactly two free-form elements with a plane surface and a free-form surface in each case, the latter, in general, being described by a polynomial expansion in accordance with equation (1). The polynomial coefficients of the two identical free-form surfaces of the specific embodiment (surface numbers 9 and 10) are as follows:

| | | | | | |
|---|---|---|---|---|---|
| $y$: | −6.6000E-03 | $x^2y$: | −2.8406E-05 | $y^3$: | −9.4687E-06 |
| $x^4y$: | 1.6446E-07 | $x^2y^3$: | 1.0964E-07 | $y^5$: | 3.2892E-08 |

Here, for example, the value assigned to the term $x^2y^3$ corresponds to the coefficient $C_{2,3}$ from equation (1). This free-form profile constitutes a superposition of a term for the third order spherical aberration in accordance with equation (5) with a defocus term in accordance with equation (2) and a tilt term.

At this point, reference is once again made to the fact that there are mathematically infinitely many equivalent representations of the same surfaces, and so it would not be expedient to link the invention explicitly to the surface representation.

The profile of the free-form surfaces of the wavefront manipulator of the first specific embodiment is depicted in FIG. 6. While the profile has a negative distance from a mean profile plane in an upper region of the free-form surface, it has a positive distance from the mean profile plane in the lower region in FIG. 6. The distance from the mean profile plane is substantially zero in the center of the profile. This region with a distance of zero from the mean profile plane broadens at the left-hand edge and right-hand edge of the profile, with a positive distance from the mean profile plane once again being present at the upper left-hand and right-hand edge and a negative distance from the mean profile plane being present at the lower outer left-hand and right-hand edge.

The profile in the first specific embodiment has (arbitrarily) been selected in such a way that, in the case of the stop of 2.8 and when a spherical undercorrection is set in the 3rd order spherical aberration, the associated refocusing by way of the defocus component emerges automatically from the free-form profile. In order to obtain this, the free-form surface constitutes a superposition of a surface in accordance with equation (5) with at least a surface in accordance with equation (2). For other stop positions or for setting the WF manipulator in such a way that it supplies overcorrected spherical aberrations in the 3rd order spherical aberration, the lens needs to be refocused by displacing the rear lens group from the surface 12, that is, which includes the stop 7 and the second lens-element combination 3.

The lateral movement range of the two free-form elements (surfaces 8 and 9 and surfaces 10 and 11) is ±2.5 mm in each case, wherein the two optical components always move exactly counter to one another and along the y-coordinate direction of the system. (If the movement was selected in the x-direction, the powers of x and y in the description of the free-form surface would be interchanged accordingly. In the case of an arbitrary position of the displacement axis relative to the system coordinate system, different coefficients would arise for the completely congruent free-form surface, and so the coefficients are only meaningful in conjunction with the coordinate system.)

If the full displacement range of the free-form elements is exploited, an adjustable wavefront aberration of ±32 λ in the case of an aperture of 1.8 or of ±5.4 λ in the case of an aperture of 2.8 or of 1.3 λ in the case of an aperture of 4.0 arises for the 3rd order spherical aberration. The refocusing of the lens required in each position of the wavefront manipulator in combination with the respective stop position is brought about by displacing the rear lens part, which includes the stop 7 and the lens-element arrangement 3 adjoining the stop 7 on the image side.

FIGS. 7 and 8 show sectional images of the lens at an infinite object distance for the zero position and for the effective position with maximum deflection in one direction of the wavefront manipulator 5. Plotted are the central pencil and the oblique pencil of rays belonging to the maximum image height of y'=15 mm. In FIG. 7, it is possible to identify that the rays of the central pencil and the rays of the oblique pencil of rays are focused exactly onto the image sensor 11. By contrast, in the case of the wavefront manipulator 5 in an effective position (FIG. 8), the back focus of the rays of the central pencil is reduced in relation to the rays of the oblique pencil of rays, and so the rays of the central pencil already intersect upstream of the sensor plane of the image sensor 11. Hence, a spherical aberration is present.

Figure 9:
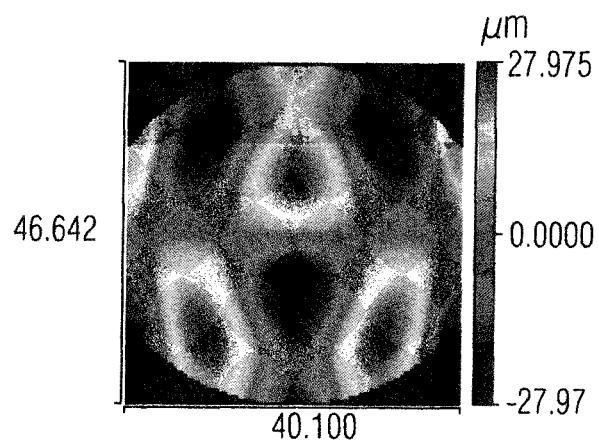
FIG. 9 shows the free-form surface of a modified wavefront manipulator, as may find use in the first specific embodiment for the lens according to the invention.

While the wavefront manipulator 5 in the first specific embodiment includes free-form profiles with profile surfaces for causing a third order spherical aberration, use may also be made in the first specific embodiment of a wavefront manipulator, the profile surfaces of which are embodied to cause a combination of a third order spherical aberration and a fifth order spherical aberration. The profile of the free-form surfaces of such a wavefront manipulator (which also still contains a defocus term) is depicted in FIG. 9. Compared to the profile surface depicted in FIG. 6, in which the negative distances extend from the mean profile plane in the upper region of the profile surface over a substantial part of the width of the profile surface and, likewise, the positive distances extend from the mean profile surface in the lower region of the profile surface over a substantial part of the width of the profile surface, the profile surfaces with negative distance from the mean profile plane are substantially interrupted by a region with a positive distance from the mean profile plane in the profile surface shown in FIG. 9. Accordingly, the region with a positive distance from the mean profile plane (lower region of the profile) is interrupted by a section with a negative distance from the mean profile plane in the profile shown in FIG. 9. The free-form profile depicted in FIG. 9 has the following coefficients:

| | | | | | |
|---|---|---|---|---|---|
| $y$: | 5.4000E−03 | $x^2y$: | −1.1298E−04 | $y^3$: | −3.7660E−05 |
| $x^4y$: | 4.8194E−07 | $x^2y^3$: | 3.2129E−07 | $y^5$: | 9.6388E−08 |
| $x^6y$: | −5.5358E−10 | $x^4y^3$: | −5.5358E−10 | $x^2y^5$: | −3.3215E−10 |
| $y^7$: | −7.9083E−11 | | | | |

In this example, the coefficients are selected in such a way that the wavefront manipulator in the case of a maximum deflection (±2.5 mm) and in the case of a full aperture produces a fifth order spherical aberration with contributions of ±16 λ in addition to, and at the same time as, the third order spherical aberration with contributions of ±32 λ, wherein, however, the contributions of the fifth order spherical aberration always have the inverse sign to the contributions of the third order spherical aberration and have a fixed relationship thereto of 1:−0.5. This combination leads to the modulation transfer function (MTF) dropping off only very little in the case of low spatial frequencies (≤5 lines per millimeter) but dropping off very strongly in the case of higher spatial frequencies (≥30 lines per millimeter). Empirically, it was found that an image impression which is perceived to be particularly pleasant arises in this ratio of contributions of the third order spherical aberration to contributions of the fifth order spherical aberration.

A second specific embodiment for a lens according to the invention will be described below with reference to FIGS. 10 to 12. In contrast with the first specific embodiment described with reference to FIGS. 6 to 8, the first lens-element arrangement 1 of the second specific embodiment has a significantly larger number of lenses. By contrast, the second lens-element arrangement 3 has a reduced number of lenses in relation to the second lens-element arrangement of the first specific embodiment. A wavefront manipulator 5 and an aperture stop 7 are situated between the first lens-element arrangement 1 and the second lens-element arrangement 3. While the wavefront manipulator is depicted in a zero position in FIG. 11, the wavefront manipulator 5 is depicted in an effective position in FIG. 12.

Figure 10:
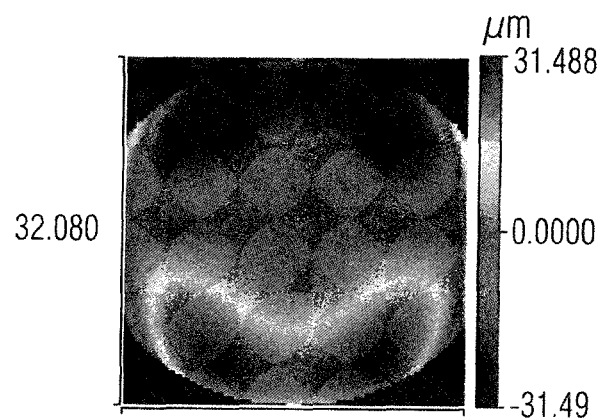
FIG. 10 shows the profile of the free-form surface of an optical component of the wavefront manipulator in accordance with a second specific embodiment for the lens according to the invention.

The profile of the free-form surfaces of the wavefront manipulator of the second specific embodiment is depicted in FIG. 10. This serves substantially for producing a third order spherical aberration and it is therefore similar in terms of structure to the profile from FIG. 6.

The second specific embodiment constitutes a further lens, configured according to the invention, for a photography or cine-application. The lens has a focal length of 25 mm and a relative aperture of f/1.75. The image circle diameter is at most 18 mm and the maximum distortion lies at around 2%.

The maximum settable absolute value of the third order spherical aberration in the case of a maximum travel of the free-form elements of ±2.0 mm is approximately ±14 λ at the reference wavelength of 546.074 nm. The following table contains the overview of the construction data of the optical system, with dummy surfaces being omitted. The radii and distances are once again specified in the table as dimensionless indices in so-called lens units, that is, all radii and distances may be interpreted in such a way that they are multiplied throughout by the same unit of measurement (nm, μm, mm, m). In the present specific embodiment, the unit of measurement is mm.

| Surface No. | Surface type | Surface radius | Distance to the next surface | Glass |
|---|---|---|---|---|
| Object | | | | |
| 1 | Sphere | 108.3896 | 4.00 | NLASF44 (Schott) |
| 2 | Sphere | 58.2438 | 11.9753 | |
| 3 | Sphere | 91.5692 | 15.4746 | NSK5 (Schott) |
| 4 | Sphere | −355.4749 | 0.50 | |
| 5 | Sphere | 75.2149 | 2.50 | SFPL51 (Ohara) |
| 6 | Sphere | 26.1919 | 22.9848 | |
| 7 | Sphere | −57.1428 | 2.50 | SFPL51 (Ohara) |
| 8 | Sphere | 44.6248 | 18.2346 | |
| 9 | Sphere | 227.8161 | 2.50 | NLAK10 (Schott) |
| 10 | Sphere | 53.2855 | 13.0469 | SFPL51 (Ohara) |
| 11 | Sphere | −98.7321 | 0.9654 | |
| 12 | Sphere | 86.4962 | 14.5378 | SFPL51 (Ohara) |
| 13 | Sphere | −57.1321 | 0.50 | |
| 14 | Sphere | 41.3163 | 10.4626 | NLASF43 (Schott) |
| 15 | Sphere | 84.9045 | 9.6659 | |
| 16 | Sphere | ∞ | 2.50 | NLASF44 (Schott) |
| 17 | | | 0.02 | |
| 18 | | | 2.50 | NLASF44 (Schott) |
| 19 | Sphere | ∞ | 3.2378 | |
| 20 (stop) | Sphere | ∞ | 1.2622 | |
| 21 | Sphere | −264.1395 | 2.50 | SF4 (Schott) |
| 22 | Sphere | 19.6653 | 6.6539 | SFPL51 (Ohara) |
| 23 | Sphere | 7962.4250 | 4.7102 | |
| 24 | Asphere | 65.1343 | 4.7679 | NLASF44 (Schott) |
| 25 | Sphere | −101.2157 | 32.00 | |
| Image | | | | |

The associated coefficients of the free-form surface are:

| $x^2y$: | −7.8039E−05 | $y^3$: | −2.6810E−05 | $x^4y$: | 4.5582E−07 |
|---|---|---|---|---|---|
| $x^2y^3$: | 3.0371E−07 | $y^5$: | 9.1119E−08 | | |

Here, for example, the value assigned to the term $x^2y^3$ corresponds to the coefficient $C_{2,3}$ from equation (1). This free-form profile constitutes a superposition of a term for the third order spherical aberration in accordance with equation (5) with a defocus term in accordance with equation (2).

The profile in this example has (arbitrarily) been selected in such a way that, in the case of a full aperture (stop of 1.76) and when a spherical undercorrection (third order spherical aberration) is set, the associated refocusing by way of the defocus component emerges automatically from the free-form profile. The associated profile of the free-form surfaces is shown in FIG. 10. Focusing the lens to other object distances is carried out by displacing the cemented element formed by lens elements 5 and 6 (as counted from the object side), which represents an inner focusing member.

Figure 11:
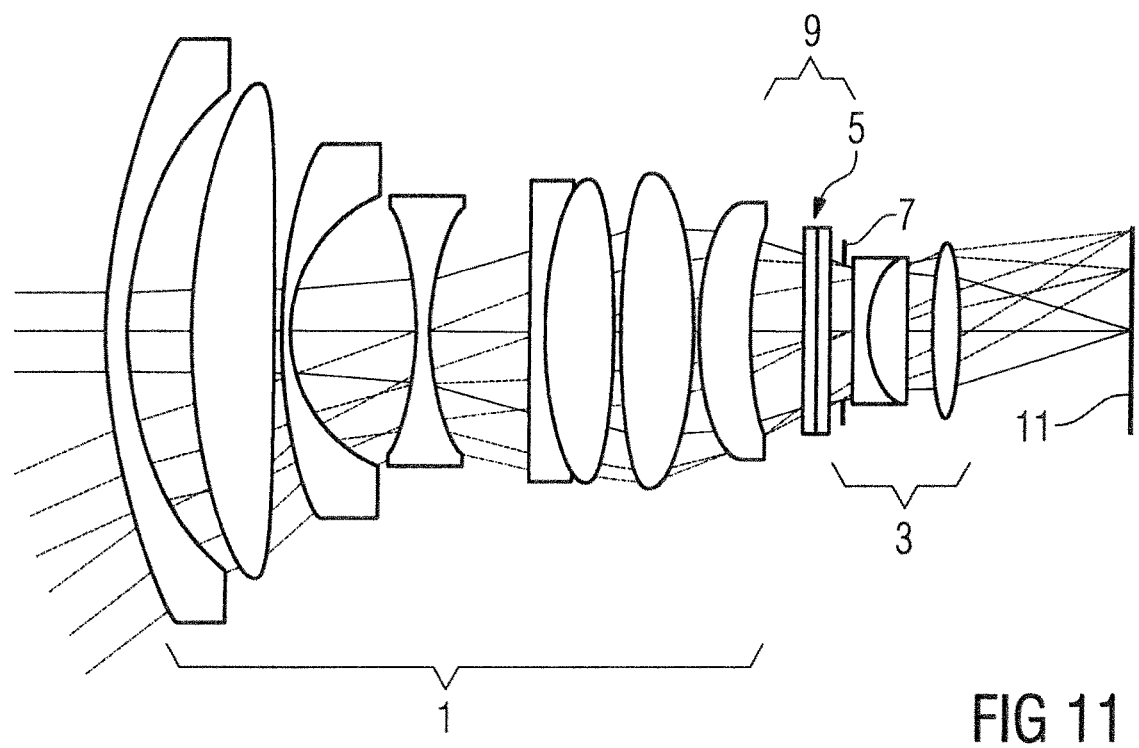
FIG. 11 shows the lens in accordance with the second specific embodiment, with the wavefront manipulator in the zero position; and, FIG. 12 shows the lens in accordance with the second specific embodiment, with the wavefront manipulator in an effective position.
Figure 12:
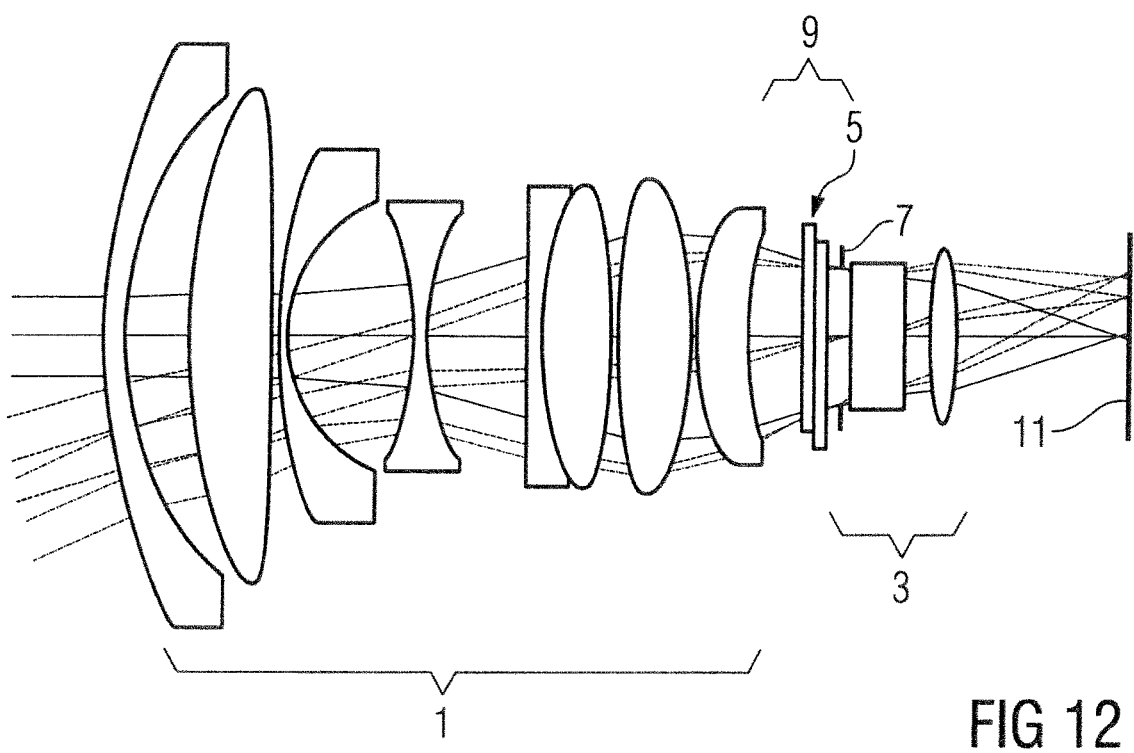

FIGS. 11 and 12 show sectional images of the lens in accordance with the second specific embodiment at an infinite object distance for the zero position and for the effective position with maximum deflection in one direction of the wavefront manipulator 5. The central pencil and the oblique pencils of rays associated with image heights of y'=10.7 mm and y'=17.8 mm are plotted. In FIG. 11, it is possible to identify that the rays of the central pencil and the rays of the oblique pencils of rays are focused exactly onto the image sensor 11, whereas the rays of the pencils in the effective position of the wavefront manipulator have different back focuses, and so a spherical aberration is present.

It is understood that the foregoing description is that of the preferred embodiments of the invention and that various changes and modifications may be made thereto without departing from the spirit and scope of the invention as defined in the appended claims.

LIST OF REFERENCE SIGNS

1 Lens-element arrangement
3 Lens-element arrangement
5 Wavefront manipulator
7 Aperture stop
9 Interstice
11 Image plane
13 Converging lens
15 Diverging lens
17 Converging lens
19 First optical component
21 Second optical component
23 Free-form surface>
25 Free-form surface>
27 Plane surface
29 Plane surface
31 Actuator
33 Actuator
34 Actuator
35 Immersion medium
37 Calculation unit
39 Detection unit

What is claimed is:

1. An objective lens for transmitting a collimated beam with an image of an object for a still or film camera, the objective lens comprising:

a first lens-element arrangement;
a second lens-element arrangement;
at least one wavefront manipulator;
the objective lens having imaging properties and defining an optical axis along which the collimated beam travels defined by axis-near rays and axis-remote rays;
said first lens element arrangement and said second lens element arrangement being arranged mutually spaced along the optical axis of the objective lens such that an interstice is present between said first lens-element arrangement and said second lens-element arrangement;
said wavefront manipulator being situated in said interstice between said first lens element arrangement and said second lens element arrangement;
said wavefront manipulator including at least two optical components which are arranged so as to be displaceable counter to one another and perpendicular to the optical axis of the objective lens;
said two optical components of said wavefront manipulator having respective free-form surfaces adjacent to each other;
said two optical components of said wavefront manipulator having a zero position wherein said free-form surfaces of said at least two optical components conjointly define a gap therebetween having a same distance present between said free-form surfaces at each location along said gap and so do not cause any image aberrations in said imaging properties of the objective lens;
said two optical components of said wavefront manipulator further having effective positions whereinto said at least two optical components are displaced counter to one another, out of said zero position perpendicular to the optical axis of the objective lens and wherein the mutually adjacent free-form surfaces of said at least two optical components have different curvatures at points thereof lying opposite one another to intentionally introduce a spherical aberration into said imaging properties of the objective lens when said two optical components are in said effective positions causing said axis-remote rays to be focused differently from said axis-near rays to effect a blurring either the foreground or the background of the image of the object;
said objective lens having variables associated therewith which are relevant to ascertaining said effective positions of said at least two optical components;
a sensor for receiving at least one of said variables of the lens, wherein said at least one variable is relevant to ascertaining a suitable effective position of said at least two optical components of said wavefront manipulator; and,
a processor connected to said sensor and being configured to generate actuating signals corresponding to displacement paths for said at least two optical components of said wavefront manipulator for reaching said effective position proceeding from said zero position based upon said at least one variable detected by said sensor and a desired degree of spherical aberration.

2. The objective lens of claim 1, wherein said free-form surfaces have respective curvatures formed to cause at least a third order spherical aberration in said imaging properties of the objective lens when said optical components of said wavefront manipulator are in said effective positions.

3. The objective lens of claim 1, wherein said free-form surfaces have respective curvatures formed to cause at least a fifth order spherical aberration in said imaging properties of the objective lens when said wavefront manipulator is in said effective positions.

4. The objective lens of claim 1 further comprising:
a physical aperture stop disposed in said interstice between said first lens-element arrangement and said second lens-element arrangement; and,
said wavefront manipulator being situated in front of or behind said physical aperture stop.

5. The objective lens of claim 1 further comprising:
an aperture stop disposed in said interstice between said first lens-element arrangement and said second lens-element arrangement; and,
said wavefront manipulator being situated at said virtual aperture stop.

6. The objective lens of claim 1 further comprising an actuator assigned to one of said first and second lens-element arrangements to displace at least a part of said one of said first and second lens-element arrangements along said optical axis.

7. The objective lens of claim 1, wherein said optical components are made of a material having a refractive index dispersion deviating from a normal line; and, wherein said at least two optical components with said free-form surfaces are made of a material having a deviation in the refractive index dispersion from said normal line.

8. The objective lens of claim 1, wherein said at least one wavefront manipulator is removable from the lens.

9. The objective lens of claim 1, wherein said wavefront manipulator includes an immersion medium between said at least two optical components with said free-form surfaces.

10. The objective lens of claim 9, wherein said optical components are made of a material having a refractive index dispersion deviating from a normal line; and, wherein said immersion medium has a deviation in the refractive index dispersion from the normal line.

11. The objective lens of claim 1, wherein:
said free-form surfaces are defined in a Cartesian coordinate system having an x-axis, a y-axis, and a z-axis, wherein the z-axis represents the optical axis of the lens and the z-coordinates of said free-form surface are described in dependence upon the x- and y-coordinates by a polynomial expansion form $$z = \Sigma_{m,n=0}^{\infty} C_{m,n} x^m y^n$$

wherein $C_{m,n}$ denotes the expansion coefficient of the polynomial expansion of the respective free-form surface of order m with respect to the x-coordinate and of order n with respect to the y-coordinate, wherein a movement direction of said at least two optical components with said free-form surfaces extends parallel to the y-axis and only terms of odd order n and of even order m have expansion coefficients $C_{m,n}$ that differ from zero.

12. The objective lens of claim 11, wherein at least said expansion coefficients of the terms $x^4y$, $x^2y^3$, and $y^5$ differ from zero.

13. The objective lens of claim 12, wherein the expansion coefficient of the terms $x^2y$ and $y^3$ differs from zero.

14. The objective lens of claim 12, wherein the expansion coefficient of the term y differs from zero.

15. The objective lens of claim 11, wherein at least the expansion coefficients of the terms $x^6y$, $x^4y^3$, $x^2y^5$, $y^7$ differ from zero.

16. The objective lens of claim 15, wherein the expansion coefficient of the terms $x^2y$ and $y^3$ differs from zero.

17. The objective lens of claim 15, wherein the expansion coefficient of the term y differs from zero.

18. A method for targeted dampening of specific spatial frequency regions of a modular transfer function of an objective lens transmitting a collimated beam with an image of an object for a still or film camera, the objective lens including a first lens-element arrangement, a second lens-element arrangement, and, at least one wavefront manipulator, the objective lens having imaging properties and defining an optical axis along which the collimated beam travels defined by axis-near rays and axis-remote rays, the first lens element arrangement and the second lens element arrangement being arranged mutually spaced along the optical axis of the lens such that an interstice is present between the first lens-element arrangement and the second lens-element arrangement, the wavefront manipulator being situated in said interstice between the first lens element arrangement and the second lens element arrangement, the wavefront manipulator including at least two optical components which are arranged so as to be displaceable counter to one another and perpendicular to the optical axis of the lens, the two optical components of the wavefront manipulator having respective free-form surfaces adjacent to each other, the two optical components of the wavefront manipulator having a zero position wherein the free-form surfaces of the at least two optical components conjointly define a gap therebetween having a same distance present between said free-form surfaces at each location along said gap and so do not cause any image aberrations in said imaging properties of the objective lens, the two optical components of the wavefront manipulator further having effective positions whereinto the at least two optical components are displaced counter to one another, out of said zero position perpendicular to the optical axis of the objective lens and wherein the mutually adjacent free-form surface of the at least two optical components have different curvatures at points thereof lying opposite one another to introduce a spherical aberration into the imaging properties of the objective lens when the two optical components are in the effective positions; the method comprising the steps of:
displacing the free-form surfaces counter to one another and perpendicular to the optical axis of the objective lens so as to intentionally introduce said spherical aberration into said imaging properties of the objective lens when said two optical components are in said effective positions causing said axis-remote rays to be focused differently from said axis-near rays to effect a blurring either the foreground or the background of the image of the object;
said objective lens having variables associated therewith which are relevant to ascertaining said effective positions of said at least two optical components;
providing a sensor for receiving at least one of said variables of the lens, wherein said at least one variable is relevant to ascertaining a suitable effective position of said at least two optical components of said wavefront manipulator; and,
providing a processor connected to said sensor and being configured to generate actuating signals corresponding to displacement paths for said at least two optical components of said wavefront manipulator for reaching said effective position proceeding from said zero position based upon said at least one variable detected by said sensor and a desired degree of spherical aberration.

19. The method of claim 18, wherein said displacing the free-form surfaces counter to one another and perpendicular to the optical axis causes at least a third order spherical aberration.

20. The method of claim 18, wherein said displacing the free-form surfaces counter to one another and perpendicular to the optical axis causes at least a fifth order spherical aberration.

21. An objective lens for transmitting a collimated beam with an image of an object for a still or film camera, the objective lens comprising:
- a first lens-element arrangement;
- a second lens-element arrangement;
- a wavefront manipulator;
- the objective lens having imaging properties and defining an optical axis along which the collimated beam travels defined by axis-remote rays and axis-near rays;
- said first lens-element arrangement and said second lens-element arrangement being arranged mutually spaced along the optical axis of the objective lens such that an interstice is present between said first lens-element arrangement and said second lens-element arrangement;
- said wavefront manipulator being situated in said interstice between said first lens-element arrangement and said second lens-element arrangement;
- said wavefront manipulator including two optical components which are arranged so as to be displaceable counter to one another and perpendicular to the optical axis of the objective lens;
- said two optical components of said wavefront manipulator having respective free-form surfaces adjacent to each other extending transversely to said optical axis;
- said two optical components of said wavefront manipulator having a zero position wherein said free-form surfaces of said two optical components conjointly define a gap therebetween having a same distance present between said free-form surfaces at each location along said gap and so do not cause any image aberrations in said imaging properties of the objective lens;
- said two optical components of said wavefront manipulator further having effective positions whereinto said two optical components are displaced counter to one another, out of said zero position perpendicular to the optical axis of the objective lens and wherein the mutually adjacent free-form surfaces of said two optical components have different curvatures at points thereof lying opposite one another intentionally introduce a spherical aberration into said imaging properties of the objective lens when said two optical components are in said effective positions causing said axis-remote rays to be focused differently from said axis-near rays to effect a blurring either the foreground or the background of the image of the object;
- said objective lens having variables associated therewith which are relevant to ascertaining said effective positions of said two optical components;
- first and second actuators corresponding to respective ones of said two optical components for moving said two optical components between said zero position and said effective positions;
- a sensor for detecting at least one of said variables of the lens, wherein said at least one variable is relevant to ascertaining said effective positions of said two optical components of said wavefront manipulator; and,
- a processor connected to said sensor and being configured to generate actuating signals as a function of said at least one variable for corresponding ones of said actuators to effect displacement paths for said two optical components of said wavefront manipulator for reaching said effective position proceeding from said zero position.

22. The objective lens of claim 21, wherein said objective lens further comprises a stop mounted on said optical axis between said wavefront manipulator and said second lens-element arrangement; and, said variables include the aperture position of said stop and a focusing setting of said objective lens.

23. A still or film camera comprising:
- an objective lens for transmitting a collimated beam with an image of an object and having a first lens-element arrangement, a second lens-element arrangement, and at least one wavefront manipulator;
- said objective lens having imaging properties and defining an optical axis along which the collimated beam travels defined by axis-near rays and axis-remote rays;
- said first lens element arrangement and said second lens element arrangement being arranged mutually spaced along the optical axis of the lens such that an interstice is present between said first lens-element arrangement and said second lens-element arrangement;
- said wavefront manipulator being situated in said interstice between said first lens element arrangement and said second lens element arrangement;
- said wavefront manipulator including at least two optical components which are arranged so as to be displaceable counter to one another and perpendicular to the optical axis of the lens;
- said two optical components of said wavefront manipulator having respective free-form surfaces adjacent to each other;
- said two optical components of said wavefront manipulator having a zero position wherein said at least two optical components conjointly define a gap therebetween having a same distance present between said free-form surfaces at each location along said gap and so do not cause any image aberrations in said imaging properties of the objective;
- said two optical components of said wavefront manipulator further having effective positions whereinto said at least two optical components are displaced counter to one another, out of said zero position perpendicular to the optical axis of the objective lens and wherein the mutually adjacent free-form surfaces of said at least two optical components have different curvatures at points thereof lying opposite one another to intentionally introduce a spherical aberration into said imaging properties of the objective lens when said two optical components are in said effective positions causing said axis-remote rays to be focused differently from said axis-near rays to effect a blurring either the foreground or the background of the image of the object;
- said objective lens having variables associated therewith which are relevant to ascertaining said effective positions of said at least two optical components;
- a sensor for receiving at least one of said variables of the lens, wherein said at least one variable is relevant to ascertaining a suitable effective position of said at least two optical components of said wavefront manipulator; and,
- a processor connected to said sensor and being configured to generate actuating signals corresponding to displacement paths for said at least two optical components of said wavefront manipulator for reaching said effective position proceeding from said zero position based upon said at least one variable detected by said sensor and a desired degree of spherical aberration.

24. An objective lens for transmitting a collimated beam with an image of an object for a still or film camera, the objective lens comprising:
   a first lens-element arrangement;
   a second lens-element arrangement;
   at least one wavefront manipulator;
   the objective lens having imaging properties and defining an optical axis along which the collimated beam travels defined by axis-near rays and axis-remote rays;
   said first lens-element arrangement and said second lens-element arrangement being arranged mutually spaced along the optical axis of the objective lens such that an interstice is present between said first lens-element arrangement and said second lens-element arrangement;
   said wavefront manipulator being situated in said interstice between said first lens-element arrangement and said second lens-element arrangement;
   said wavefront manipulator including first and second optical components which are arranged so as to be displaceable counter to one another and perpendicular to the optical axis of the objective lens;
   said first and second optical components of said wavefront manipulator having respective free-form surfaces;
   said two optical components of said wavefront manipulator having a zero position wherein said free-form surfaces of said two optical components conjointly define a gap therebetween having a same distance present between said free-form surfaces at each location along said gap and so do not cause any image aberrations in said imaging properties of the objective lens;
   each one of said first and second optical components being displaceable out of said zero position relative to the other one of said optical components in a positive direction and a negative direction perpendicular to said optical axis;
   said free-form surfaces of said first and second optical components having different curvature at points lying opposite one another to intentionally introduce a positive or negative spherical aberration into said imaging properties of said objective lens in dependence upon whether said first optical component is displaced in the negative direction and the second optical component is displaced in the positive direction or vice versa causing said axis-remote rays to be focused differently from said axis-near rays to effect a blurring either the foreground or the background of the image of the object;
   said objective lens having variables associated therewith which are relevant to ascertaining said effective positions of said two optical components;
   a sensor for receiving at least one of said variables of the lens, wherein said at least one variable is relevant to ascertaining a suitable effective position of said two optical components of said wavefront manipulator; and,
   a processor connected to said sensor and being configured to generate actuating signals corresponding to displacement paths for said two optical components of said wavefront manipulator for reaching said effective position proceeding from said zero position based upon said at least one variable detected by said sensor and a desired degree of spherical aberration.

* * * * *

UNITED STATES PATENT AND TRADEMARK OFFICE
CERTIFICATE OF CORRECTION

Page 1 of 2

PATENT NO. : 10,746,975 B2
APPLICATION NO. : 15/620643
DATED : August 18, 2020
INVENTOR(S) : Pretorius et al.

It is certified that error appears in the above-identified patent and that said Letters Patent is hereby corrected as shown below:

On the Title Page

Item (56), Under OTHER PUBLICATIONS: delete "PCT/EP20151076613" and substitute -- PCT/EP2015/076613 -- therefor.

In the Specification

In Column 8:
Line 56: delete "to" and substitute -- and -- therefor.

In Column 10:
Line 31: delete "$z = \sum_{m,n=0}^{\infty} C_{m,n} x^m y^n$" and substitute -- $z = \sum_{m,n=0}^{\infty} C_{m,n} x^m y^n$ -- therefor.

In Column 15:
Line 7: delete "(FIG. 5)" and substitute -- (FIG. 7) -- therefor.

In the Claims

In Column 20:
Line 7: delete "lens element" and substitute -- lens-element -- therefor.
Line 7: delete "second lens" and substitute -- second-lens- -- therefor.
Line 15: delete "lens element" and substitute -- lens-element -- therefor.
Line 16: delete "lens element" and substitute -- lens-element -- therefor.
Line 44: add -- of -- after "blurring".

Signed and Sealed this
Twenty-ninth Day of December, 2020

Andrei Iancu
*Director of the United States Patent and Trademark Office*

CERTIFICATE OF CORRECTION (continued)
U.S. Pat. No. 10,746,975 B2

In Column 21:
Line 45: delete "$z = \sum_{m,n=0}^{\infty} C_{m,n} x^m y^n$" and substitute -- $z = \sum_{m,n=0}^{\infty} C_{m,n} x^m y^n$ -- therefor.

In Column 22:
Line 11: delete "first lens element" and substitute -- first lens-element -- therefor.
Line 11: delete "second lens element" and substitute -- second lens-element -- therefor.
Line 16: delete "lens element" and substitute -- lens-element -- therefor.
Line 17: delete "lens element" and substitute -- lens-element -- therefor.
Line 47: add -- of -- after "blurring".

In Column 23:
Line 46: add -- to -- after "another".
Line 51: add -- of -- after "blurring".

In Column 24:
Line 19: delete "first lens element" and substitute -- first lens-element -- therefor.
Line 19: delete "second lens" and substitute -- second lens- -- therefor.
Line 25: delete "lens element" and substitute -- lens-element -- therefor.
Line 26: delete "lens element" and substitute -- lens-element -- therefor.
Line 53: add -- of -- after "blurring".

In Column 26:
Line 16: add -- of -- after "blurring".